(12) United States Patent
Freeman et al.

(10) Patent No.: US 8,282,341 B2
(45) Date of Patent: Oct. 9, 2012

(54) ROTOR ARRANGEMENT

(75) Inventors: Christopher Freeman, Nottingham (GB); Ivor J Day, Cambridge (GB)

(73) Assignee: Rolls-Royce PLC, London (GB)

( * ) Notice: Subject to any disclaimer, the term of this patent is extended or adjusted under 35 U.S.C. 154(b) by 465 days.

(21) Appl. No.: 12/712,853

(22) Filed: Feb. 25, 2010

(65) Prior Publication Data

US 2010/0254802 A1 Oct. 7, 2010

(30) Foreign Application Priority Data

Apr. 1, 2009 (GB) .................................. 0905548.4

(51) Int. Cl.
*F01D 9/02* (2006.01)

(52) U.S. Cl. .................. 415/115; 415/169.1; 415/168.1; 415/914; 415/144

(58) Field of Classification Search .................. 415/115, 415/168.1, 168.2, 168.4, 914, 52.1, 54.1, 415/58.6, 58.7, 144, 169.1, 57.3
See application file for complete search history.

(56) References Cited

U.S. PATENT DOCUMENTS

| 3,291,447 A | * | 12/1966 | Brandon | 415/111 |
| 3,746,462 A | * | 7/1973 | Fukuda | 415/115 |
| 5,562,404 A | * | 10/1996 | Koff et al. | 415/57.4 |
| 6,082,961 A | * | 7/2000 | Anderson et al. | 415/115 |
| 2008/0127491 A1 | * | 6/2008 | Lee et al. | 29/888.02 |

FOREIGN PATENT DOCUMENTS

| GB | 479427 A | 1/1938 |
| GB | 2 452 297 A | 3/2009 |

OTHER PUBLICATIONS

Jul. 28, 2009 Search Report issued in British Application No. 0905548.4.

* cited by examiner

*Primary Examiner* — Allana Lewin
*Assistant Examiner* — Aaron Jagoda
(74) *Attorney, Agent, or Firm* — Oliff & Berridge, PLC

(57) ABSTRACT

With highly loaded rotors and stators problems can occur with secondary flows sweeping low momentum fluid across the blades reducing efficiency. By provision of collector slots to collect the secondary air and direct that air to a return slot in a rotor hub it is possible to provide impetus to the collected secondary flow to an outlet slot such that there is dispersal of the secondary flow and therefore reduce the effects upon the overall performance of a gas turbine engine incorporating the arrangement.

14 Claims, 2 Drawing Sheets

ROTOR ARRANGEMENT

The present invention relates to rotor arrangements and more particularly rotor arrangements utilised in gas turbine engines in the region of rotor hubs and stator shrouds.

BACKGROUND

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

In view of the above it will be appreciated that control of flows through a gas turbine engine are important to achieve efficiency and operational performance. In such circumstances in order to extract propulsion and work blades secured upon rotor hubs are associated with stators to cause appropriate directionality with respect to flows through an engine. It will also be appreciated that the loads presented to the engine may vary over operational cycles such as takeoff, cruise, ascent, descent and landing if the engine is utilised for aircraft propulsion. It is found that highly loaded rotors and stators stall about the hub/shroud area due to secondary flows sweeping low momentum fluid from the annulus about the rotor hub and stator shroud onto the stator blades near to the peak suction point on the suction surface of the blades. In such circumstances subsequent operation is less efficient and effective over those blade suction surfaces. It would be advantageous to reduce or inhibit the effects of such secondary flows to improve engine efficiency and performance.

It will be appreciated that secondary flows relate to fluid flows through the engine blades near to the hub or shroud surface which are not part of or of lower momentum than the primary propulsion flows.

SUMMARY

In accordance with the present invention there is provided a rotor arrangement for a gas turbine engine, and a gas turbine engine including such a rotor arrangement, as set out in the claims.

BRIEF DESCRIPTION OF THE DRAWINGS

Aspects of the invention will now be described, by way of example, with reference to the accompanying drawings in which.

DETAILED DESCRIPTION OF EMBODIMENTS

As indicated above secondary fluid flows about a stator hub can diminish operational efficiency and performance within a gas turbine engine. It will be appreciated that a rotor or compressor blade assembly generates fluid flow as it is turned and therefore any slower momentum fluid swept onto the blades from the annulus, that is to say the rotor hub, will diminish performance.

In accordance with the present invention an arrangement is provided to efficiently evacuate secondary flows when performance requires it. The driven sweeping action of the rotor hub is utilised in order to provide impulse to the secondary flow away from areas of too detrimental effect. It is this rotor movement that is used to pump this secondary flow.

Figure 1:
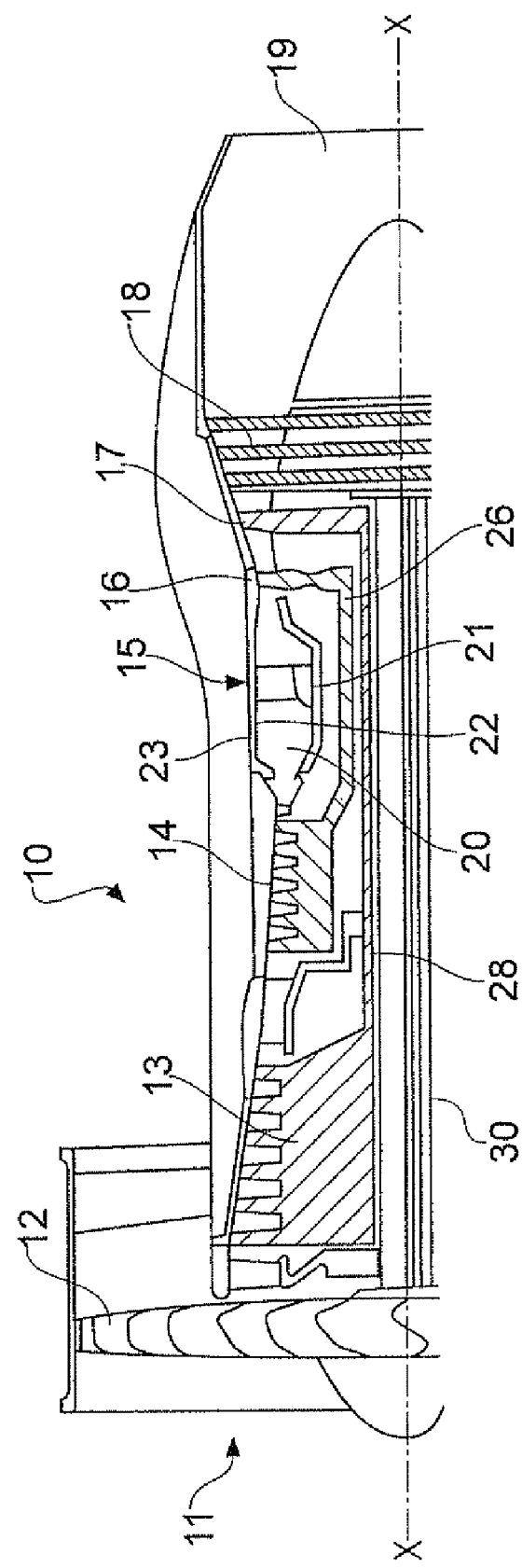
FIG. 1 is a schematic part sectional view of a gas turbine engine of known type.
Figure 2:
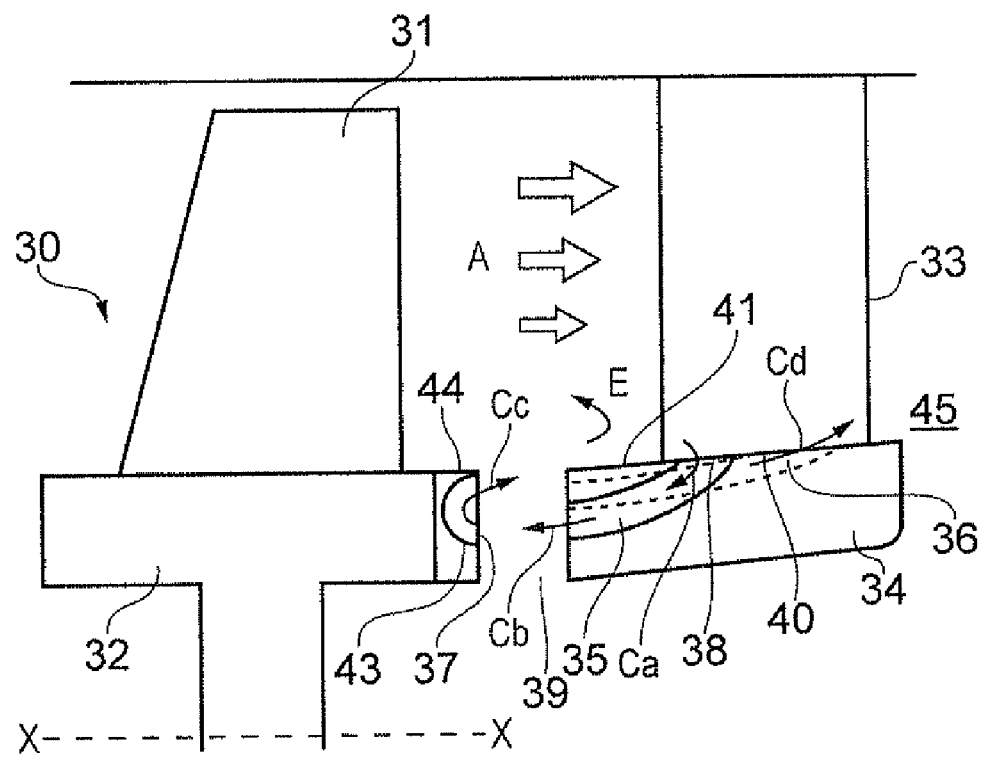
FIG. 2 is a schematic side illustration of a rotor and stator arrangement in accordance with the present invention; and, FIG. 3 is a schematic part plan cross section of the rotor and stator arrangement as depicted in FIG. 2.

FIG. 2 provides a schematic cross section of a rotor arrangement 30 in accordance with the present invention. The arrangement 30 comprises a rotor 31 secured upon a rotor hub 32. The rotor hub 32 and associated blades or rotors 31 rotate about an axis X-X past a stator 33 in a set of stators associated with a stator shroud 34. The primary function of the rotors 31 is to provide a powerful fluid flow in the direction of arrowheads A. As indicated above a particular problem is with respect to secondary flows about the hub 32 and shroud 34 sweeping low momentum fluid upwards in the direction of arrowheads E causing problems at the peak suction point on the suction surface of the rotors 31. It will be appreciated that FIG. 2 only illustrates one rotor 31 and one stator 33 but in a practical engine there will be a plurality of such rotors 31 and stators 33. The rotors 31 on the hub 32 will sweep past the stators 33 for fluid flow control.

In accordance with the present invention, the stator shroud 34 includes a collector slot 35 and an outlet slot 36 angled relative to each other for flow coupling with a return slot 37 in the rotor hub 32. In operation, secondary flow is collected at an inlet 38 of the collector slot 35 and passes along a collector passage towards the return slot 37. The collected flow is projected and given impulse by rotation of the rotor hub 32 as it sweeps past the shroud 34. Thus, the return slot 37 pumps the collected secondary flow towards the outlet passage 36 where it is taken sufficiently downstream and angled sufficiently such that there are no, or at least fewer, problems with regard to sweeping low momentum fluid upwards into the main fluid flow A.

Arrowheads C illustrate a notional secondary flow path through the slots 35, 36, 37 in accordance with the present invention. Thus, secondary flow C is initially collected and drawn into the collector slot 35 in the direction of arrowhead Ca then expelled across a gap 39 between the collector slot 35 and the return slot 37 in the direction of arrowhead Cb where that collected secondary flow is "pumped" and given impetus for return in the direction of arrowhead Cc, again across the gap 39 and into the outlet slot 36 where it is propelled along as flow Cd for release through the outlet 40.

As will be appreciated, impetus to the collected flow is provided by rotation of the rotating hub 32. This impetus is to stimulate appropriate displacement of the secondary flow along the slots 35, 36, 37. However, it is also important that the relative sizes, angles and positioning of the slots 35, 36, 37 as well as the gap 39 are considered.

Figure 3:
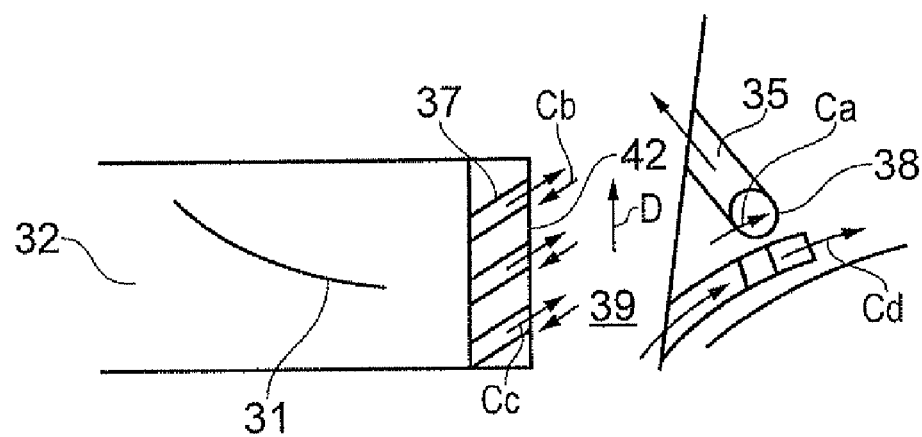

The slot 35, through the inlet 38, collects annulus fluid (secondary fluid) about an upper surface 41 of the stator shroud 34. This collected secondary fluid Ca is drawn, possibly by a displacement effect, and moved towards the return slot 37. In order to facilitate collection, generally the inlet 38 would be arranged to have a sharp turn into a collector passage forming the collector slot 35. It will be appreciated that by appropriate angling such drawing and collecting of the annulus secondary flows into the collector slot 35 is achieved and facilitated. Generally the collector slot 35 is arranged to be in the direction of sweep or travel for the hub 32 as it rotates. FIG. 3 illustrates the collector slot 35 angled towards the direction of rotation illustrated by arrowhead D. In such circumstances the windage and other effects caused by rotation of the rotor hub 32 will facilitate drawing of fluid through the inlet 38 and along the slot 35.

The return slots 37 are generally rounded to turn and provide impetus to the collected secondary flows. The return slots 37 are generally half moon shaped and utilised as indicated to provide impetus to the secondary flow Cb taken from the collector slot 35. As can be seen in the gap 39, a secondary flow Cb is turned and given impetus projection in the direction of arrowheads Cc. It will be understood that the output from the collector passage 35 is projected across the gap 39 and is then incident upon a hub surface 32 where it will be collected and as indicated provided with impetus by the rounded shaping of the return slots 37. The return slots 37 are generally half moon shaped in order to draw and project the collected secondary flow Cc towards the outlet passage 36.

The outlet passage 36 is generally angled away from the direction of sweep rotation shown by arrowhead D. It will be noted that the respective levels of the outlet from the collector passage 35 and the inlet for the outlet passage 36 are generally presented at different heights such that the respective cross flows Cb, Cc do not directly impinge with each other. It will be understood that the impetus provided by the return slot 37 will at least partially collimate the returned collected secondary flow Cc such that it becomes incident upon the inlet for the outlet passage of the outlet slot 36, if the arrangement is properly or desirably configured.

As indicated above, coupling of the flow C across the slots 35, 36, 37 and gap 39 is achieved. It will be understood that the relative sizing of the slots as indicated will depend upon operational conditions and speed of rotation in the direction of arrowhead D and gap width 39. Typically, a consideration will be made of operational conditions and slot 35, 36, 37 configurations chose for optimised or desired performance. Nevertheless, such configuration will be chosen to facilitate desired flow coupling in accordance with the invention. In terms of facilitating flow as indicated angling of the slots 35, 36 will be a factor along with a sharp turn at the inlet 38 and a smooth curved exit 40. Thus, once secondary flow is within the thrall of the arrangement in accordance with the invention there is a resistance to back flow caused by the sharp turn at the inlet 38 relative to the outlet 40. Typically, the collector passage of the collector slot 35 will be narrower than the width of the outlet passage of the outlet slot 36 again to provide a "bias" or easier direction of flow towards the outlet slot 36 compared to back along the collector slot 35. As the slots 35, 36, 37 in accordance with the invention will typically be round it will be appreciated that the outlet slot 36 will have a greater diameter than the collector slot 35.

The size and dimensions as well as the angle of the return slots 37 will be such that they are arranged to receive the collected secondary flow Cb and provide impetus and projection for that collected secondary flow towards the outlet slot 36. In such circumstance as indicated above generally, the return slots 37 will have a half moon shape in order to utilise the rotation of the hub 32 to generate impetus in the flow Cc toward the outlet slot 36. It is possible that the return slots 37 may include a wider dimension towards a bottom edge 43 compared to an upper edge 44 in order to provide greater "nip" impetus on a "sling shot" projection basis of the collected secondary flow Cc towards the outlet passage 36.

It will be understood that with the collected secondary flow Cd presented with impetus further downstream of the stator 33 as indicated above will mean there is less likelihood of causing displacement of low momentum fluid upwards into the main flow A and therefore diminishing performance. The number of slots 35, 36, 37 in the respective shroud 34 and the hub 32 will depend upon operational requirements and performance.

It will be understood that the present invention may also be utilised with regard to windage from a stator and stator shroud 34. In such circumstance it will be appreciated that a stator upstream of a rotor may create secondary flows which could impinge upon the performance of that rotor downstream. Such windage would be in an area denoted 45 in FIG. 2. In such circumstances, this windage may be utilised with regard to providing slots extending in the opposite direction to those described in the shroud 34 as well as a return slot in the downstream rotor hub to facilitate and remove secondary air impinging upon the performance of the arrangement.

As can be seen the inlet 38 for the collector slots 35 as well as outlets 40 for the outlet slots 36 are generally in the upper surface 41 of the shroud 34. By the present invention the outlet flow Cd as indicated has impetus and therefore is dispersed more readily to avoid forcing low momentum air to impinge upon the major flow A.

Modifications and alterations to the present invention will be appreciated by those skilled in the art. Thus, as indicated above the angles and dimensions of the slots 35, 36, 37 as well as their relative configuration may be adjusted to particular circumstances and each other. It will also be understood that the gap 39 is important with respect to the efficiency of coupling of the flows Cb and Cc. This gap 39 may vary in width dependant upon operational temperature and therefore the configuration, size and distribution of the slots arranged to reciprocate such variations in use. The configuration, size and distribution will be set for the gap at the normal operational temperature of the arrangement.

The invention claimed is:

1. A rotor arrangement for a gas turbine engine, the arrangement comprising a rotor hub and a stator shroud arranged to sweep past each other in use, the stator shroud including a collector slot to collect secondary flow and direct the collected secondary flow to a return slot in the rotor hub, the return slot shaped to provide in use impulse to the collected secondary flow to project the collected secondary flow to an outlet slot in the stator shroud, the collector slot and the outlet slot respectively angled relative to the return slot to facilitate coupling as the rotor hub sweeps past the stator shroud in use.

2. An arrangement as claimed in claim 1 wherein the collector slot has an inlet in an upper surface of the stator shroud.

3. An arrangement as claimed in claim 2 wherein the collector slot has a collector passage at an angle towards the direction of rotation of the rotor hub in use.

4. An arrangement as claimed in claim 3 wherein the inlet has a sharp bend into the collector passage.

5. An arrangement as claimed in claim 1 wherein the outlet slot has an outlet in the upper surface of the stator shroud.

6. An arrangement as claimed in. claim 5 wherein the outlet slot has an outlet passage at an angle away from the direction of rotation of the rotor hub in use.

7. An arrangement as claimed in claim 6 wherein the outlet extends with a rounded bend from the outlet passage.

8. An arrangement as claimed in claim 1 wherein the collector slot has a collector passage at an angle towards the direction of rotation of the rotor hub in use and the outlet slot has an outlet passage at an angle away from the direction of rotation of the rotor hub in use, and wherein the outlet passage has a greater width than the collector passage.

9. An arrangement as claimed in claim 1 wherein the collector slot has an inlet in an upper surface of the stator shroud and the outlet slot has an outlet in the upper surface of the stator shroud, and wherein the outlet has a greater width than the inlet.

10. An arrangement as claimed in claim 1 wherein the return slot is rounded.

11. An arrangement as claimed in claim 1 wherein the return slot is half moon shaped.

12. An arrangement as claimed in claim 1 wherein the return slot is angled away from the direction of rotation of the rotor hub in use.

13. An arrangement as claimed in claim 1 wherein there is a plurality of collector slots and/or return slots and/or outlet slots.

14. A gas turbine engine including a rotor arrangement as claimed in claim 1.

* * * * *